June 21, 1955     B. E. FRANK ET AL     2,711,204

TUBE BENDING MACHINE

Filed Oct. 30, 1950     12 Sheets-Sheet 1

B. E. FRANK ET AL 2,711,204

TUBE BENDING MACHINE

Filed Oct. 30, 1950

Inventors
Bernard E. Frank
and Frederick C. Cummings
by Willits Hardman & Fehr
their attorneys

United States Patent Office 2,711,204
Patented June 21, 1955

2,711,204

TUBE BENDING MACHINE

Bernard E. Frank and Frederick C. Cummings, Rochester, N. Y., assignors to General Motors Corporation, Detroit, Mich., a corporation of Delaware Application October 30, 1950, Serial No. 192,996

2 Claims. (Cl. 153—2)

This invention relates to the art of bending tubing and its object is to provide a machine for bending tubing into a serpentine having four substantially parallel portions joined by substantially 180° bends. For this purpose, the machine disclosed herein comprises a center bend form providing a tubing engaging surface of semi-circular contour about which the central portion of the tubing is formed, devices which respectively engage portions of the tubing spaced from the central portion thereof, and which are mounted for movement about the axis of curvature of the center bend form to cause portions of the tubing extending in opposite directions from the central portion to be moved into substantially parallel relation, means for forcing the central portion of the tubing against the center bend form, a mechanism for concurrently effecting operation of said means and movements of said devices to move said oppositely extending portions into substantial parallelism and apparatus for forming return bends in the tubing at portions thereof spaced from the central portion.

Further objects and advantages of the present invention will be apparent from the following description, reference being had to the accompanying drawings, wherein a preferred embodiment of the present invention is clearly shown.

Figures 7, 8:
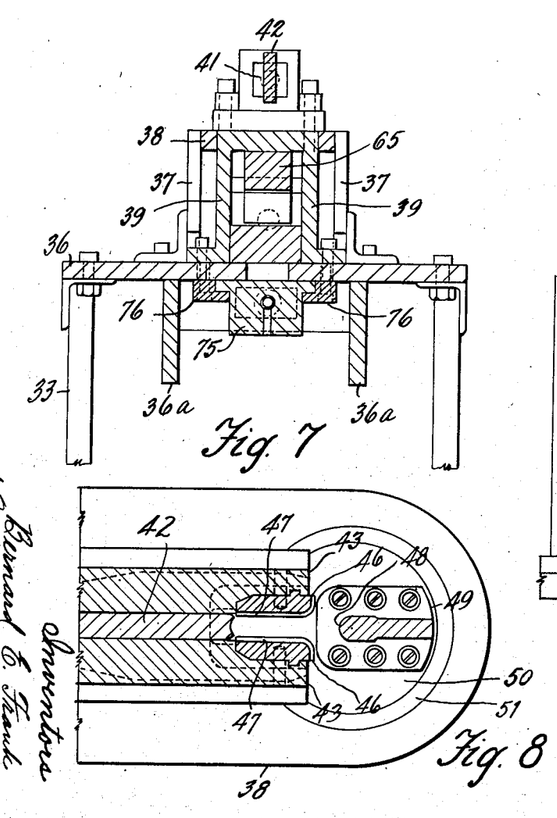
Fig. 7 is a sectional view on line 7—7 of Fig. 3.
Fig. 8 is a sectional view on line 8—8 of Fig. 3 and is on a larger scale.

Referring to Figs. 1 to 5, the machine frame comprises base plates 30 and 31 which rest upon the floor and which are connected by horizontal angle bars 32 supporting vertical bars 33 connected by horizontal channels 34. Bars 33 support horizontal angle bars 35 (Fig. 5) which support a table 36. Table 36 (Fig. 1) supports brackets 37 which support a plate 38 supported also by a frame 39 (Fig. 7).

Figures 1, 1A:
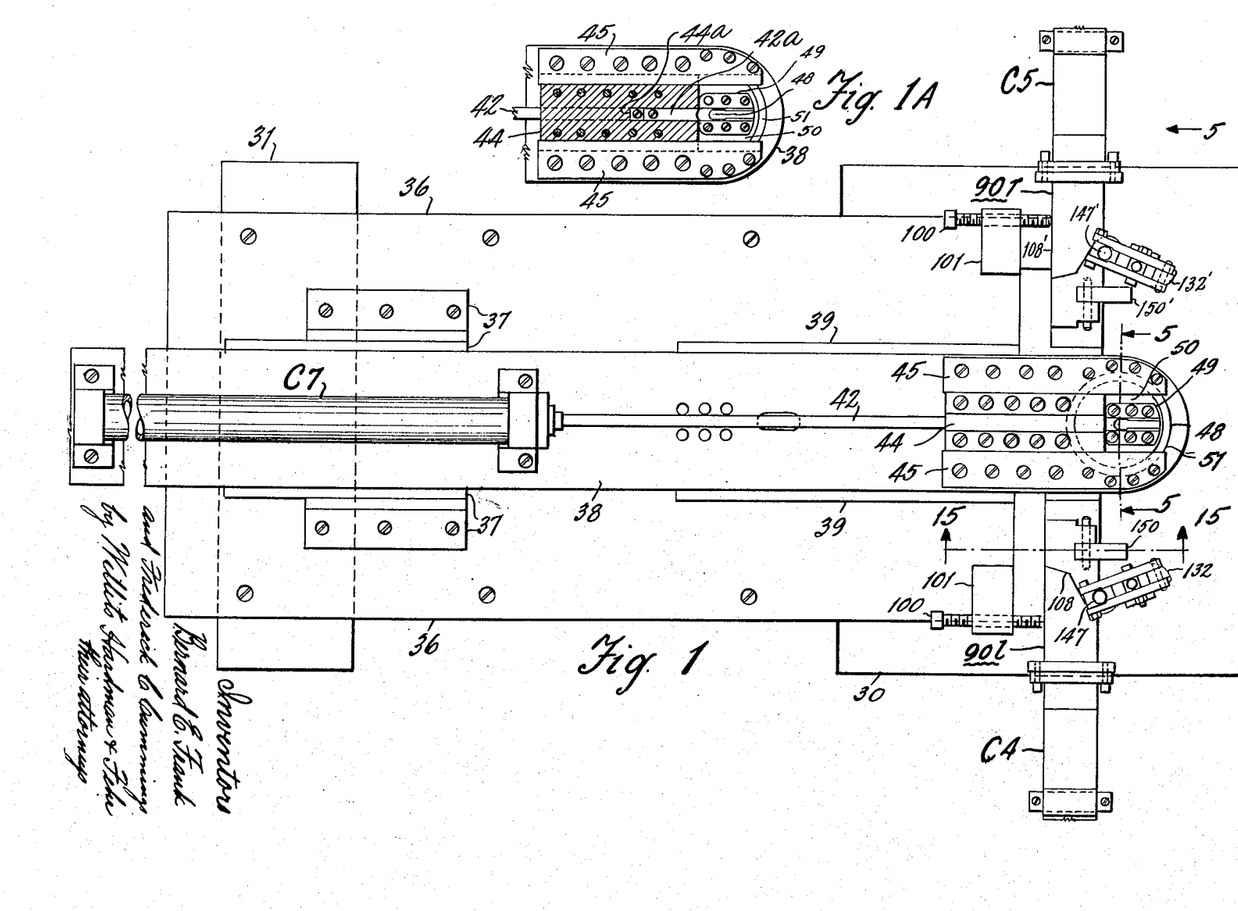
Fig. 1 is a plan view of the machine.
Fig. 1A is a sectional view on line 1A—1A of Fig. 3.
Figure 2:
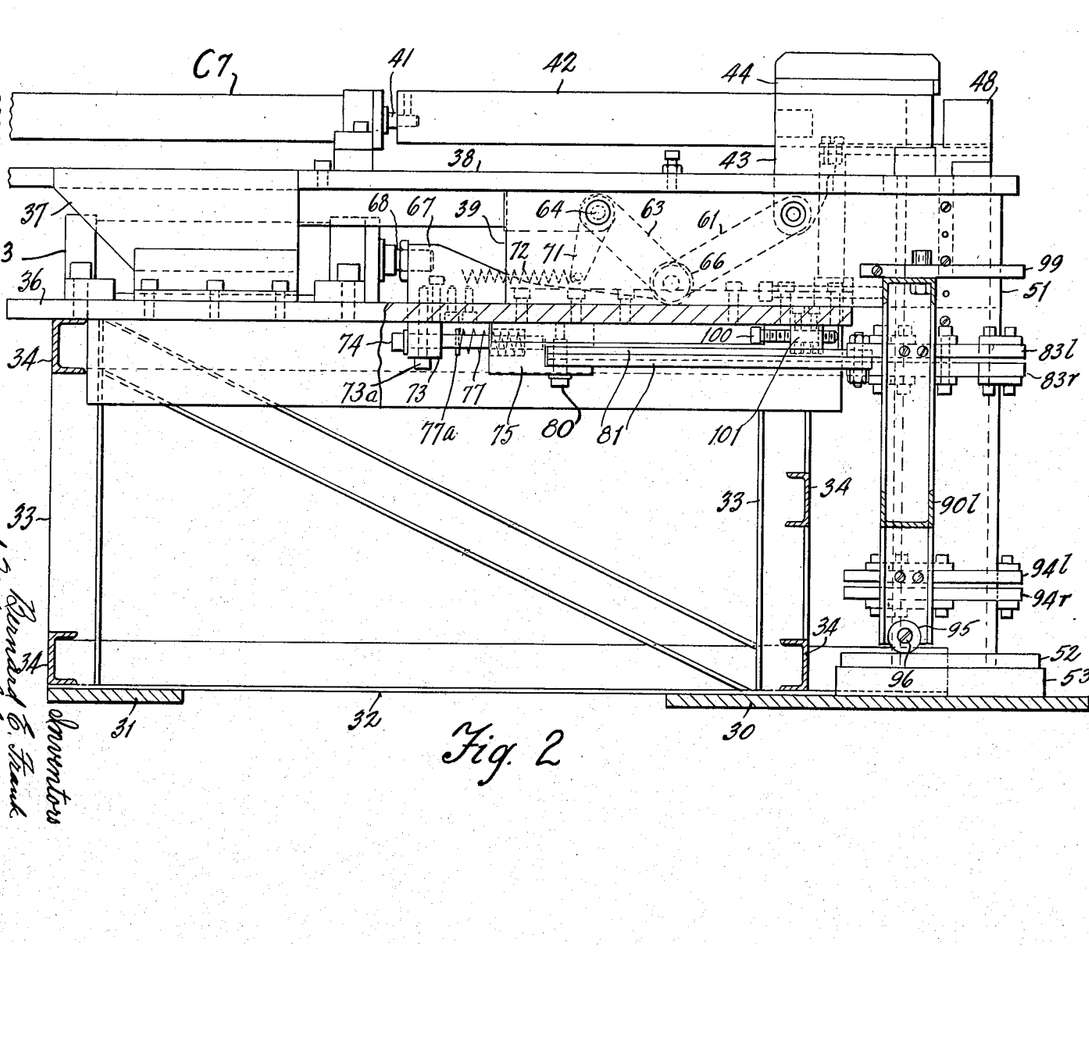
Fig. 2 is a side view thereof with the part in section taken on the line 2—2 of Fig. 4.
Figure 3:
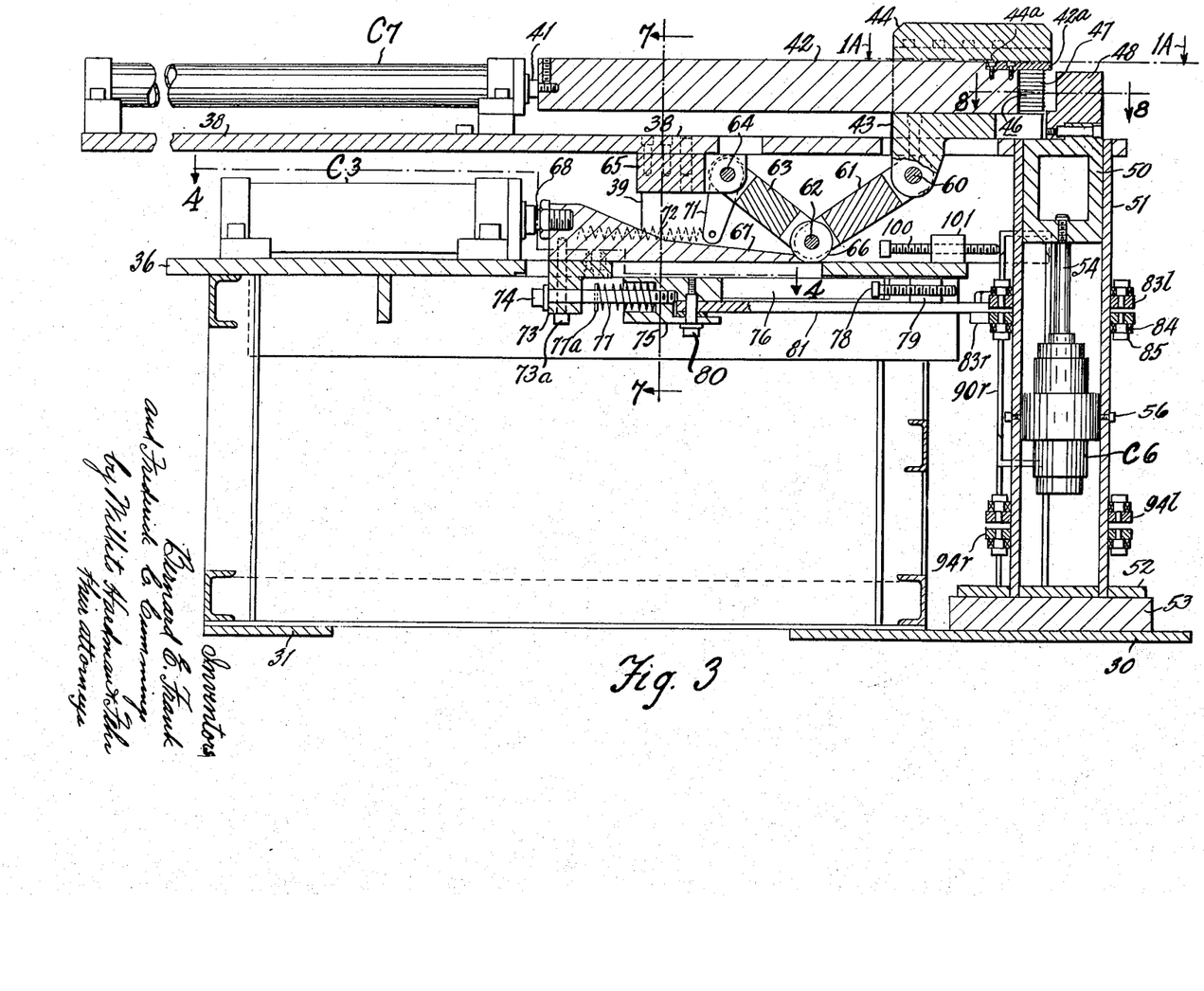
Fig. 3 is a sectional view on line 3—3 of Fig. 4.

Plate 38 (Figs. 1, 2 and 3) supports a cylinder C7 containing a piston 40 connected by rod 41 with a bar 42 which extends into a sliding member 43 which supports a cover plate 44 and which is guided for movement along the plate 38 by bars 45 attached thereto. Sliding member 43 (Fig. 8) carries two shoes 46 each having tubing receiving grooves 47 for causing, when the sliding member is moved to the right, a plurality of pieces of tubing stacked vertically to be bent around a center bend shoe 48 extending vertically from a base 49 which is attached to a support 50 guided for vertical movement by a tubular column 51 supported by frame 39 and by a base 52 supported by a plate 53 supported by a base 30 (Fig. 3). Support 50 is connected with the piston rod 54 of a piston 55 slidable in a cylinder C6 supported by column 51.

The cover 44 (Fig. 3) has a shoulder 44a which is engageable with a similar shoulder of a bar 42a attached to bar 42 so that right movement of sliding member 43 which carries the cover 44 will cause right movement of bar 42 at a time when no pressure fluid is applied to the left end of cylinder C7.

Sliding member 43 (Fig. 3) is connected by a pin 60 with a toggle link 61 connected by a pin 62 with a toggle link 63 connected by a pin 64 with a bracket 65 supported by plate 38. Pin 62 carries two rollers 66, one of which is shown in Fig. 2, adapted to be engaged by a cam 67 attached to a piston rod 68 connected with a piston 69 slidable in a cylinder C3 supported by a table 36. Pin 64 is connected with a lever 71 which a spring 72 connects with a fixed part. Right movement of cam 67 lifts the rollers 66 to cause the toggle links 61 and 63 to be more nearly aligned, thereby causing right movement of the slide 44. Left movement of cam 67 permits the spring 72 to lower the rollers 66 and return the slide 44 to the position shown in Fig. 3.

Figure 4:
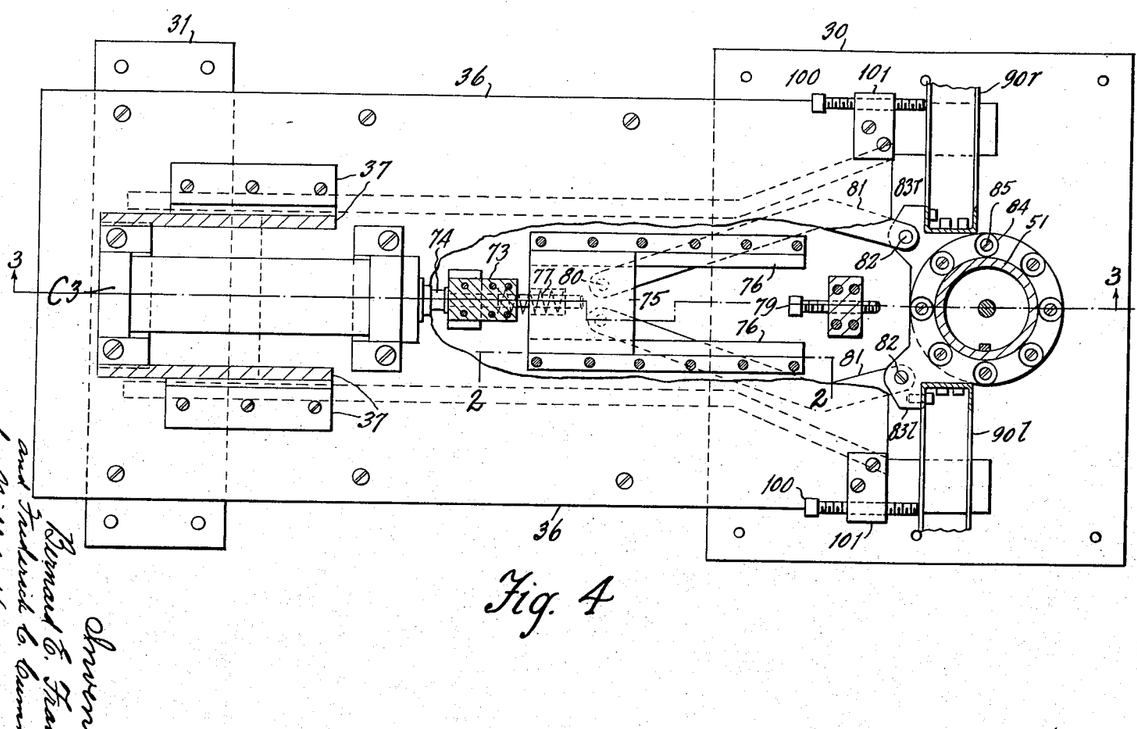
Fig. 4 is a sectional view on line 4—4 of Fig. 3.

Cam 67 has a lug 73 secured thereto by screws 73a and through which there extends a screw 74 threadedly engaging a block 75 which, as shown in Fig. 4, is guided by rails 76, secured to table 36, for horizontal movement along the underside of table 36. When cam 67 moves right, motion is transmitted from lug 73 to block 75 through spacing washer 77a and a normally uncompressed stiff spring 77 so that the block 75 moves right until stopped by engagement with a screw 78 threaded through a bracket 79 attached to plate 36. Referring to Fig. 4, block 75 is connected by pins 80 with links 81 connected by pins 82 with arms 83r and 83l, one being above the other as shown in Fig. 3. Arms 83r and 83l are journalled for rotation about the column 51 by rollers 84 pivotally supported by screws 85 attached to these arms and bearing on the exterior cylindrical surface of the column 51. When block 75 is moved right in Fig. 3, the arms 83r and 83l are caused to rotate in opposite directions about the column 51. When cam 67 and lug 73 are moved to the left, the arms 83r and 83l are returned to the position shown in Fig. 4, due to the engagement of lug 73 (Fig. 3) with the head of screw 74.

The arms 83r and 83l are connected, respectively, with wings 90r and 90l (Fig. 5) each comprising a frame having a horizontal bar 91, a vertical bar 92 and an oblique bar 93. Wings 90r and 90l are attached, respectively to arms 94r and 94l shaped like arms 83r and 83l and also carrying rollers 84 which bear on the column 51. The vertical bars 92 of these wings are supported by plates 52 which receive rollers 95 journalled on screws 96 attached to frame part 92. Wings 90r and 90l are guided also for movement about the axis of column 51 by rollers 97 (Fig. 6) journalled on screws 98 attached to frame parts 91 and engageable with curved plates 99 attached to the bracket 39 with which the column 51 is integral. As shown in Fig. 4, the counterclockwise movement of wing 90r and the clockwise movement of wing 90l to aligned positions is stopped by engagement of the wing frames with adjustable stop screws 100 threaded through brackets 101 attached to table 36.

Figures 5, 6:
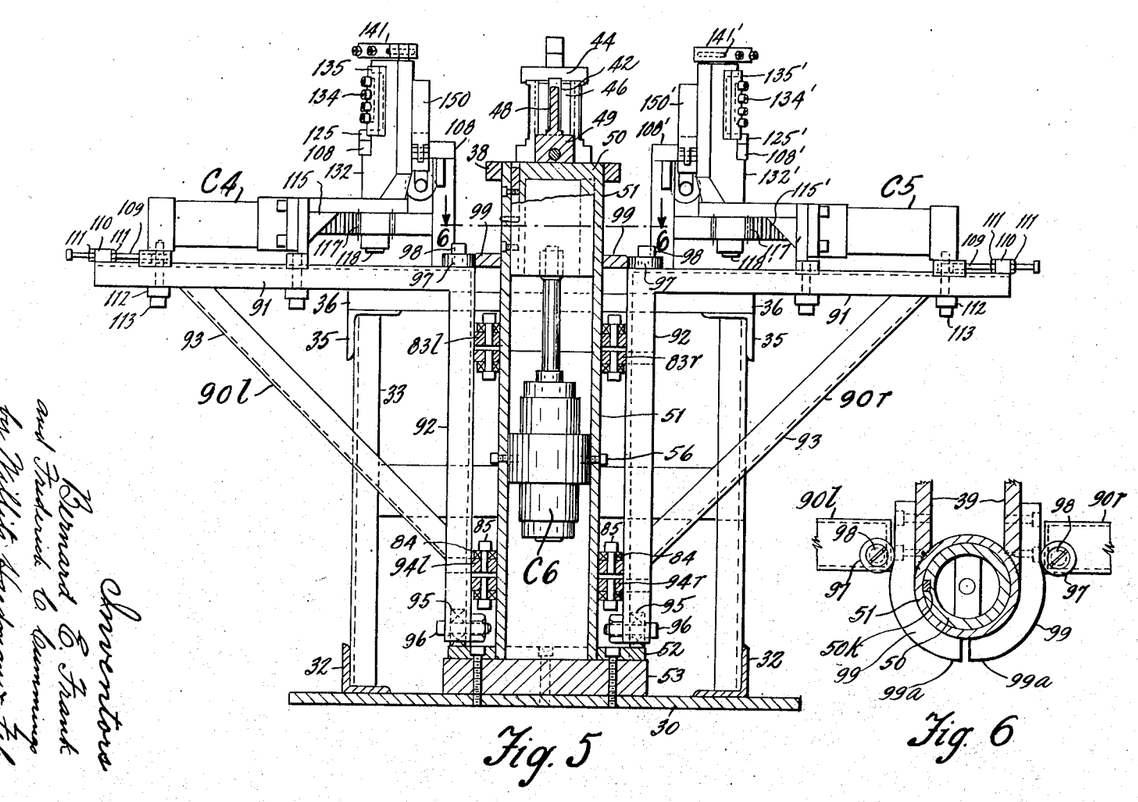
Fig. 5 is a view in the direction of arrow 5 of Fig. 1, the part in section being on line 5—5 of Fig. 1.
Fig. 6 is a sectional view on line 6—6 of Fig. 5.

As shown in Fig. 6, plates 99 have portions 99a which are shaped so that rollers 97 may approach closer to the axis of column 51 as the wings are caused to approach each other closely during completion of the center bending operation so that the tubing will not be under such tension as would cause it to be distorted from round to elliptical cross sectional contours.

Figures 11, 12, 13, 14:
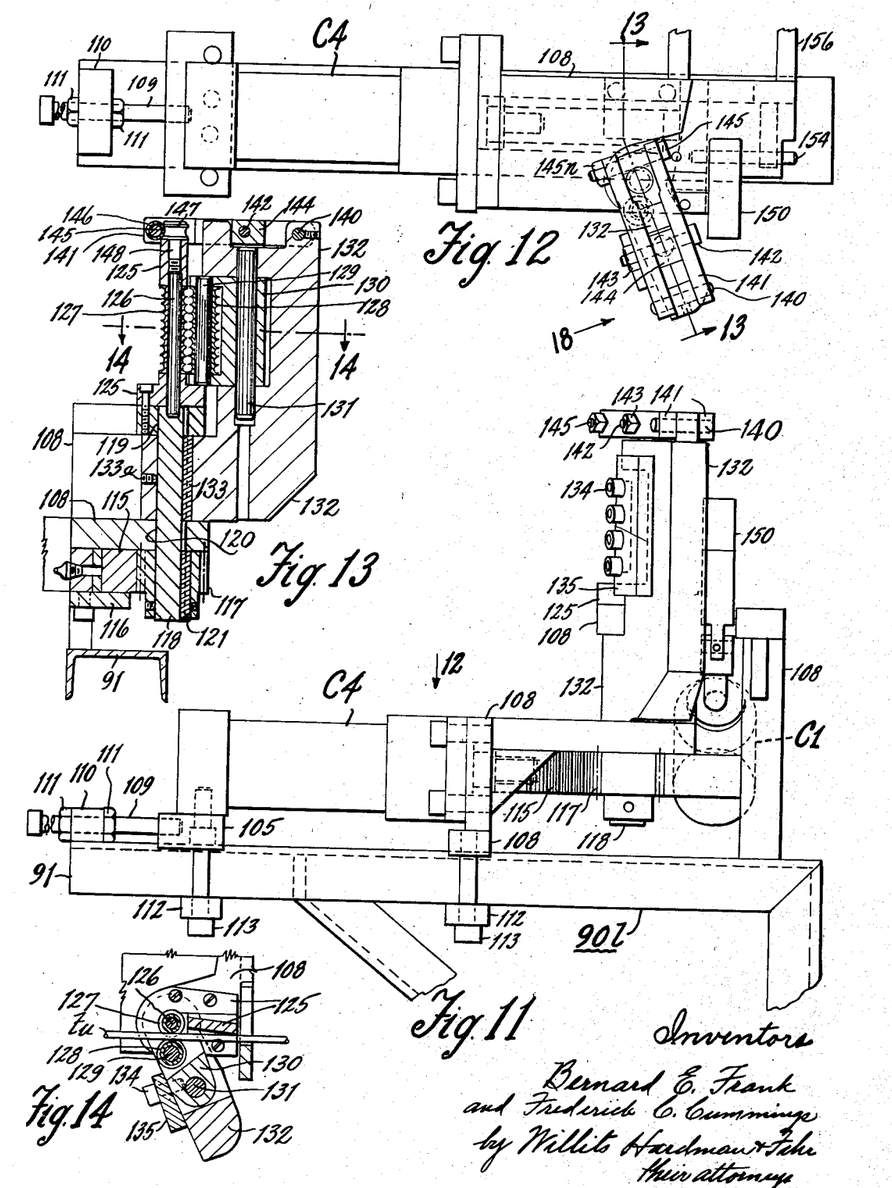
Fig. 11 is an enlargement of the upper left hand portion of Fig. 5.
Fig. 12 is a view in the direction of arrow 12 of Fig. 11.
Fig. 13 is a sectional view on line 13—13 of Fig. 12.
Fig. 14 is a sectional view on line 14—14 of Fig. 13.

As shown in Fig. 11, the left wing 90l supports a plate 105 which is movable along the frame part 91 and which is attached to a cylinder C4 containing a piston 107 and also attached to a frame 108 which is likewise slidable along the frame part 91. The adjustment of plate 105, the frame 108 and the cylinder C4 along the part 91 can be effected by adjustment of a screw 109 relative to the part 91. The screw is threaded in the plate 105 and slidable in a block 110 attached to frame part 91. Screw 109 receives nuts 111 positioned on opposite sides of block 110. Adjustment is effected by holding screw 109 against rotation while one of the nuts 111 is loosened and the other tightened until the plate 105 is in the proper position. The plate 105 and the frame 108 are clamped to part 91 by clamping plates 112 through which there pass screws 113 threaded into the plate 105 and the frame 108.

Frame 108 (Fig. 13) provides a guide for a rack 115 retained by a plate 116 attached to frame 108. Rack 115 meshes with a gear 117 attached to a shaft 118 journalled in bearings 119 and 120 provided by frame 108. Gear 117 is secured to shaft 118 by the key 121. Frame 108 (Fig. 13) supports a bracket 125 which supports a rod 126 in alignment with shaft 118. Rod 126 provides a bearing for a grooved roller 127 spaced from a grooved roller 128 a distance sufficient to receive in the grooves of these rollers a plurality of pieces of tubing. Roller 128 is journalled on a pin 129 supported by a frame 130 journalled on a pin 131 carried by frame 132 screwed to shaft 118 for rotation therewith by a key 133 and screw 133a. The frame 130 is retained in fixed relation to the frame 132 by a plate 135 bearing against frame 132 and which is attached to frame 130 by screws 134.

Frame 132 carries a pivot pin 140 (Figs. 11 and 12) for bars 141 which are clamped by a screw 142 and nut 143 against a spacer 144. Bars 141 receive a screw 145 which supports a sleeve 146 received by a grooved roller 147 attached to the upper end of bracket 125 by a screw 148. Through the cooperation of roller 147, sleeve 146, screw 145, bars 141 and pin 140, the upper end of the bracket 125 is tied to the upper end of the frame 132 thus maintaining the rods 126, 131 and 129 in parallelism.

Figures 24, 25, 26, 27, 28:
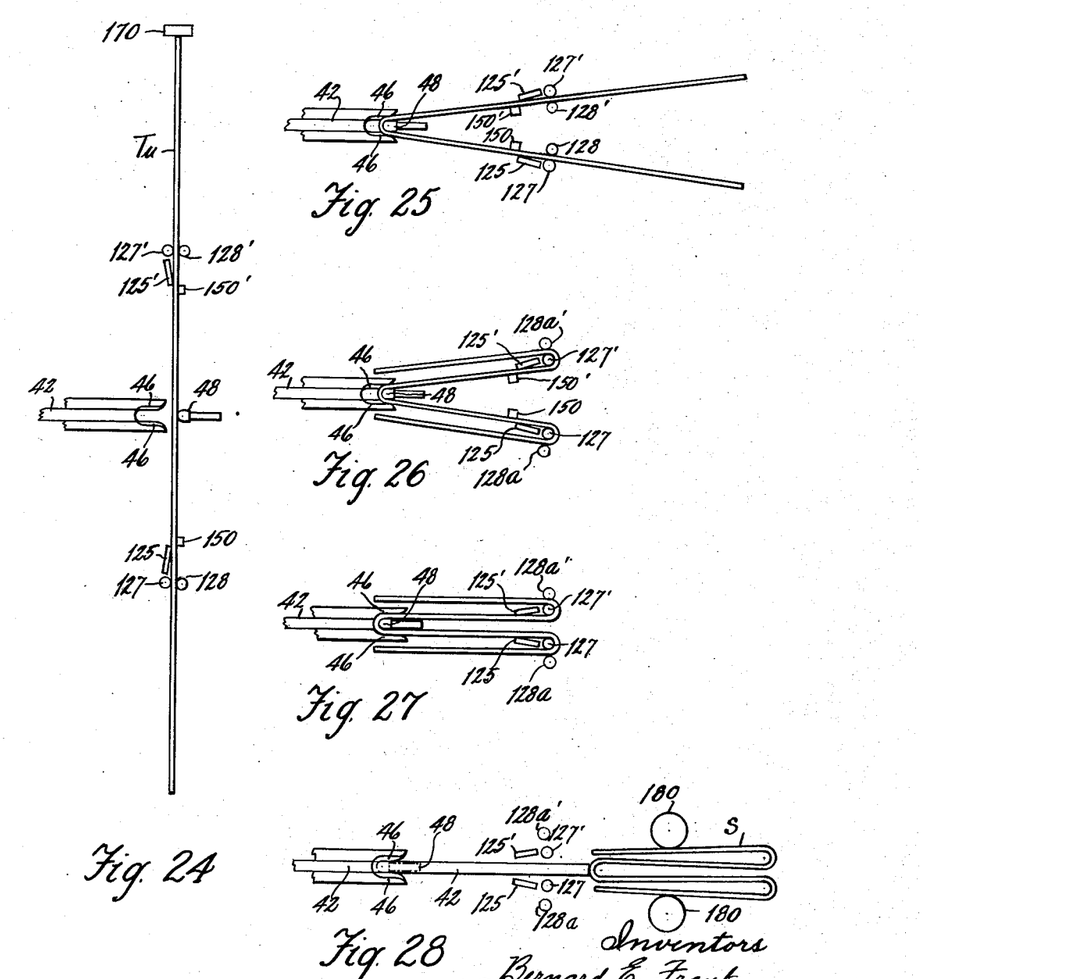
Figs. 24 through 28 are diagrams showing the steps of forming a length of tubing into a serpentine.

Admission of pressure fluid to the outer or left end of cylinder C4 causes orbited movement of roller 128 clockwise about roller 127 from the position shown in Fig. 25 to the position 128a shown in Fig. 26 to effect the wing-bend or return-bend which is lower in Fig. 26.

The right wing 90r supports the same kind of mechanism as supported by left wing 90l. Like parts supported by wing 90r are indicated by like reference numerals with primes affixed except that the right wing bend cylinder is marked C5 in Figs. 5 and 29. When roller 128 moves to the position 128a shown in Fig. 26, roller 128' moves to the position 128a' shown in Fig. 26, to effect the other wing bend or return bend which is upper in Fig. 26.

Figure 15:
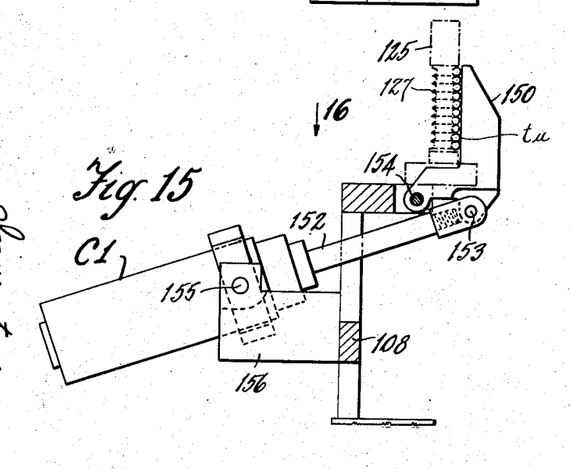
Fig. 15 is an enlarged scale and sectional view on line 15—15 of Fig. 1, showing a tubing clamp and its operating mechanism.
Figure 16:
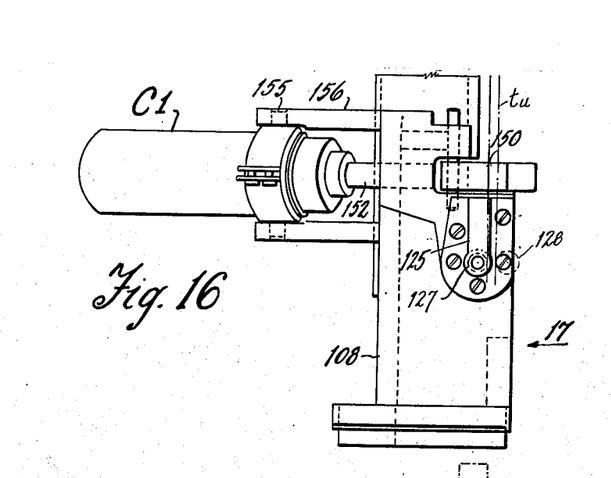
Fig. 16 is a view in the direction of arrow 16 of Fig. 15.
Figure 17:
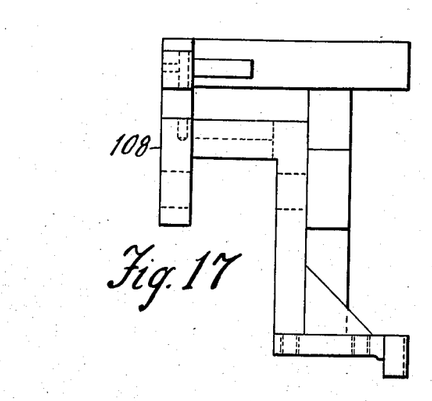
Fig. 17 is a view of a tubing clamp supporting bracket and is taken in the direction of arrow 17 of Fig. 16.
Figure 18:
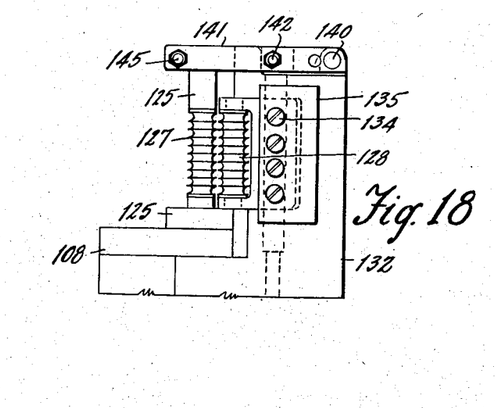
Fig. 18 is a view in the direction of arrow 18 of Fig. 12.

During the wing bending operations, completed as shown in Fig. 26, the tubing is clamped against the brackets 125 and 125' by wing bend back-up clamps 150 and 150'. Fig. 15 shows clamp 150 of the left wing 90l in clamping position. Clamp 150 is moved to such position by application of pressure fluid to the outer end of a cylinder C1 which contains a piston 151, shown in Fig. 29, connected by a rod 152 and a pin 153 with clamp 150 which is pivoted at 154 on frame 108. Cylinder C1 is pivoted at 155 on an extension 156 of frame 108. Clamp 150 is retracted from clamping position by application of pressure fluid to the inner end of cylinder C1 while its outer end is connected with a drain.

Clamp 150' is actuated in a similar manner by a fluid pressure servo comprising a cylinder C2 (Fig. 29) containing a piston 151'.

Retraction of clamps 150, 150' is effected before the final center bending operation takes place as shown in Fig. 27, by completion of movement of shoes 46 toward center bend shoe 48. During the completion of this movement, fluid pressure is relieved at the outer ends of cylinders C4 and C5 whereby rollers 128, 128' will ease up on wing bend pressure so that completion of movement of shoe 46 can effect the final step of bending, to the form shown in Fig. 27, without distortion of the tubing and ejection of the completely bent tubing is facilitated by reduction of the pressure exerted by the rollers thereon.

Figures 19, 20, 21, 22, 23A, 23B:
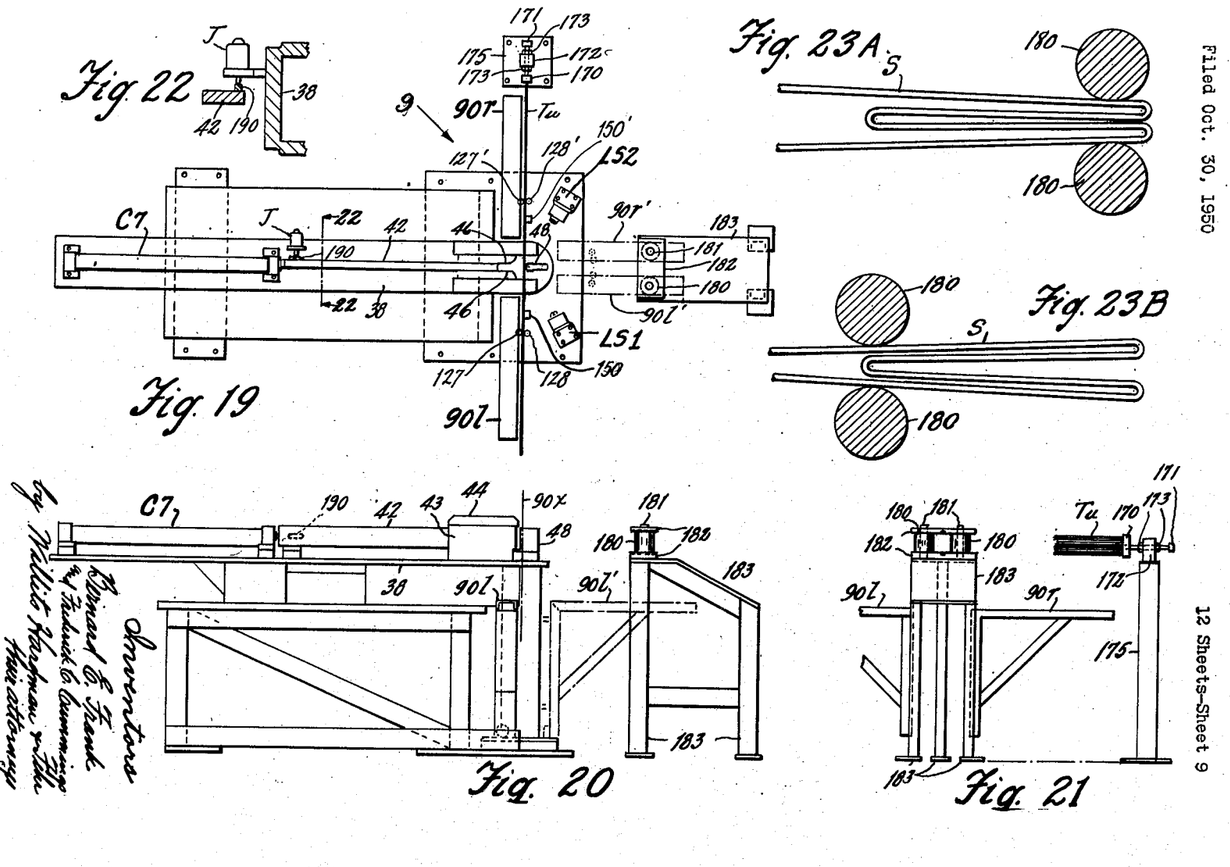
Figs. 19, 20 and 21 are diagrammatic plan, side and end views of the machine showing particularly the location of a control valve and two limit switches.
Fig. 22 is a sectional view on line 22—22 of Fig. 19.
Figs. 23A and 23B are diagrams showing how the serpentine is squeezed while being ejected.

In Fig. 20, the axis of rotation of the wings 90l and 90r (Fig. 19) is represented by line 90x. Preparatory to the bending operation, the lengths of tubing Tu are passed from left toward right as viewed in Fig. 21, or upwardly, as viewed in Figs. 19 and 24, between rollers 126 and 128, between shoes 46 and 48 and between rollers 126' and 128' which are of such construction and dimensions that a number of lengths of tubing can be stacked above each other so that a plurality of lengths will be simultaneously bent. The right ends (Fig. 21) of the lengths of tubing Tu are vertically aligned by pushing the lengths against a plate 170 supported by a rod 171 slidable in a bracket 172 and adjusted by nuts 173 threaded on the rod and movable to secure the rod 171 in any desired position of adjustment relative to the supporting bracket 172. Such bracket is secured to the upper end of a pedestal 175 extending upwardly from the floor.

Ejection of the serpentine tube elements S, after bending is effected, by bar 42 is shown diagrammatically in Fig. 28 and is accompanied by a squeezing of these serpentine elements as shown in Figs. 23A and 23B which is effected by contact of such elements with rollers 180 pivotally supported by rods 181 extending between plates 182 supported by a frame 183 at the proper height above the floor. Squeezing of the serpentine elements gives them a set such that when they leave rollers 180, each of them has four relatively parallel straight parts.

After ejection, the bar 42 is returned to initial position shown in Fig. 3. As bar 42 returns, a cam 190 (Figs. 19, 20, 29) thereon operates a valve J for a purpose to be described. Valve J is supported by plate 38.

Figure 9:
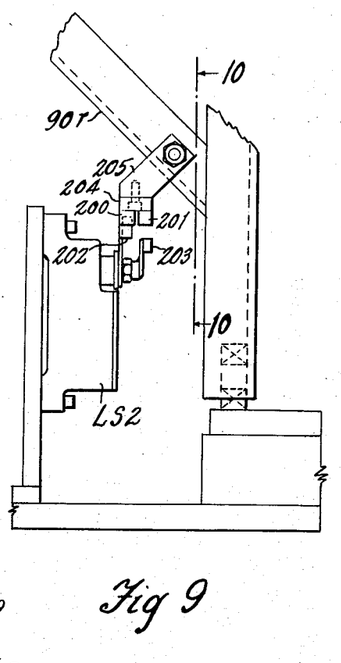
Figs. 9 and 10 are side and front views, respectively, of a switch and operating mechanism thereof.
Figure 10:
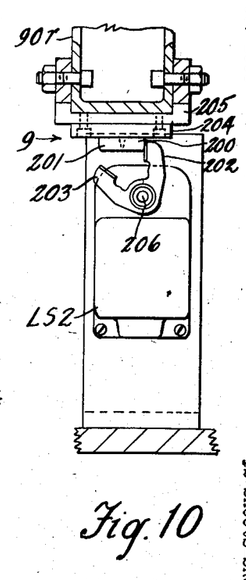

As wings 90l and 90r are moved respectively counterclockwise and clockwise about axis 90x, they effect in sequence the closing of switches Ls1 and Ls2. Switch Ls2 is shown in Figs. 9 and 10. Fig. 9 may be considered as a view looking in the direction of arrow 9 of Fig. 19 and Fig. 10 as a view in the direction of arrow 10 of Fig. 9. As wing 90r moves clockwise in Fig. 19, or away from the observer of Fig. 9, it moves right in Fig. 10. During the right movement, a block 200 on a plate 204 attached to a bracket 205 attached to wing 90r engages a lever arm 202 attached to a shaft 206 of switch Ls2; and shaft 206 is caused to rotate clockwise to effect closure of switch Ls2 through operation of a snap-mechanism of this switch. As wing 90r moves further, lever 202 moves away from the path of movement of block 200.

As wing 90r returns counterclockwise to initial position, it moves left in Fig. 10. During this left movement of wing 90r, block 201 attached to plate 204, engages lever arm 203 attached to shaft 206 to effect counterclockwise rotation of shaft 206 and the opening of switch Ls2.

Switch Ls1 is closed by counterclockwise movement (Fig. 19) of wing 90l and is opened by clockwise movement thereof by mechanism similar to that used to operate switch Ls2.

Figure 30:
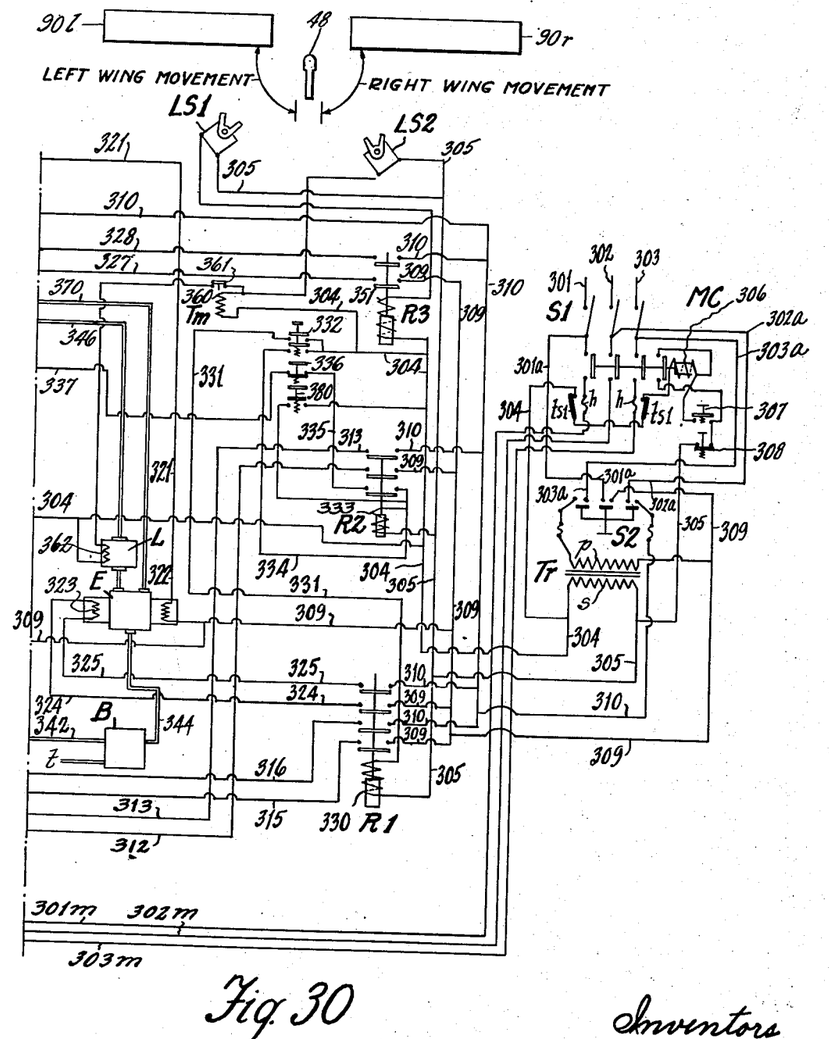

Referring to Fig. 30, wires 301, 302, 303 connected with the three-phase A. C. circuit at 440 volts, are connected by switch S1 with wires 301a, 302a, 303a, respectively. Motor control switch MC connects wires 301a, 302a, 303a, respectively, with wires 301m, 302m, 303m connected with pump motor PM. Manually operated switch S2 connects wires 301a and 303a with primary winding p of transformer Tr having a secondary winding s connected with wires 304 and 305. Magnet coil 306 of switch MC is in a circuit including wire 304, thermal switches ts1, switch 307 when closed, normally closed switch 308 and wire 305. To start motor PM, switch 307 is closed to complete the circuit of coil 306 and switch MC connects the motor PM with wires 301a, 302a and 303a and closes a by-pass around switch 307. To stop the motor PM, the switch 308 is opened. In case of motor overload, one or both of the switches ts1 open due to heating by resistance elements h in the circuit to motor PM, and the switch MC opens.

Switch SW2 connects wire 301a with wire 309 and wire 302a with wire 310 which supply 440 volts A. C. to various electromagnets controlling hydraulic valves. Wires 304 and 305 supply 110 volts A. C. to the magnet coils of various relay switches.

Valve A (Fig. 29) has a control magnet coil 311 connected with wires 312 and 313 which relay R2 connects with wires 309 and 310 respectively, when this relay closes. Valve D has a control magnet coil 314 connected with wires 315 and 316, which relay R1 connects with wires 309 and 310 respectively, when this relay closes. Valve D has a control magnet coil 317 connected with wire 309 and by wire 318 with a switch 319 of a pressure unit G. When switch 319 is closed, wire 318 is connected with wire 310. Wire 310 is connected with switch 320 of a pressure unit I. When switch 320 is closed, wire 310 is connected with a wire 321 connected with control magnet coil 322 of valve E connected with wire 309.

Valve E has a control magnet coil 323 connected with wires 324 and 325 which are connected by relay R1 with wires 309 and 310, respectively, when this relay closes.

Valve F (Fig. 29) has a control magnet coil 326 connected with wires 327 and 328 which are connected, respectively, with wires 309 and 310 when relay R3 closes.

Figure 29:
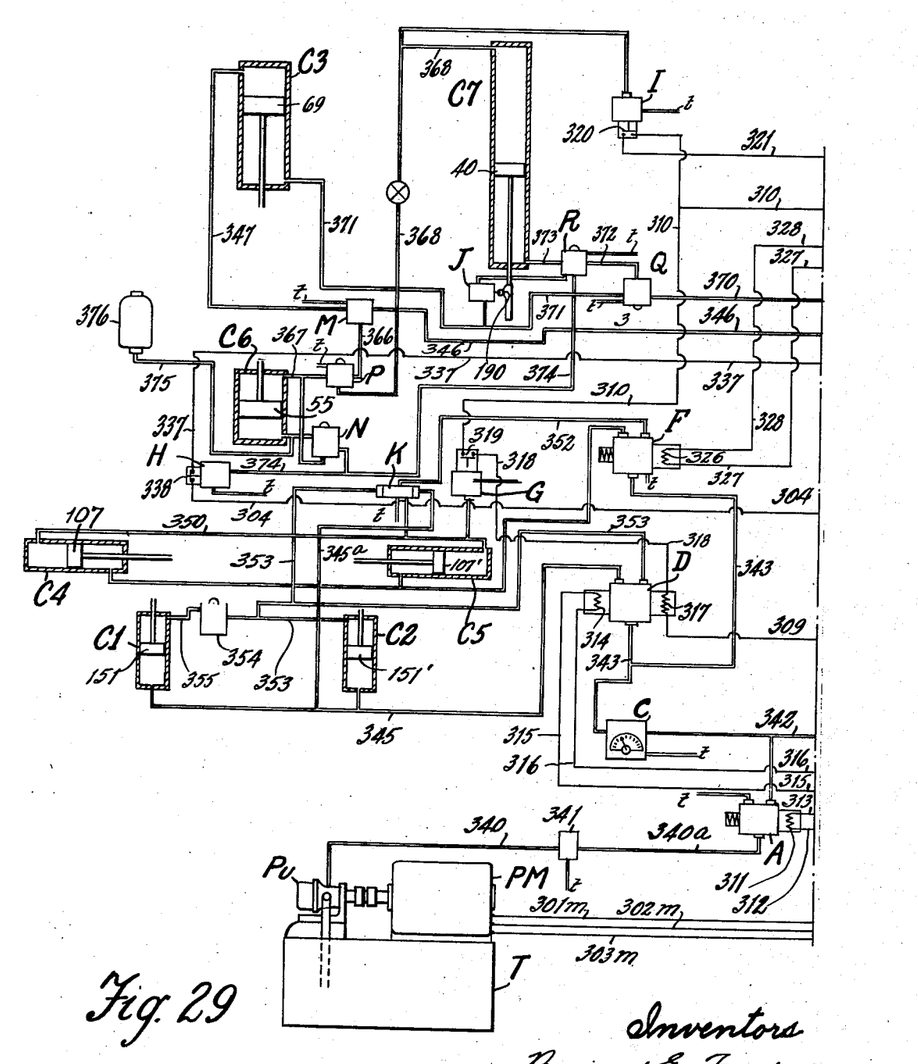
Figs. 29 and 30 together constitute a hydraulic circuit and electrical wiring diagram.

Relay R1 (Fig. 30) has a magnet coil 330 which is energized by closing start switch 332 which establishes the following circuit: Wire 305, coil 330, wire 331 and wire 304. When switch 332 is closed, coil 33 of relay R2 receives current through the following circuit: Wire 305, coil 333, wire 334, switch 332, wire 304. Relay R2 connects wire 334 with wire 335 which is connected with a normally closed stop switch 336 connecting with wire 337 and which, as shown in Fig. 29, is connected by a normally closed switch 338 of a pressure unit H with wire 304. Therefore, the coil 333 of relay R2 remains energized after the switch 332 is released and is spring returned to open status.

So long as relay R2 is closed, coil 311 of valve A (Fig. 29) is energized and oil flows from motor driven pump P from tank T through pipe 340, relief valve 341, pipe 340a, valve A, pipe 342 through flow metering valves B and C to pipes 343 and 344.

While switch 332 is closed and relay R1 is energized, and coil 314 receives current and causes valve D to pass oil from pipe 343 to pipe 345 and thence to cylinders C1 and C2 for the purpose of causing the wing-bend backup clamps 150 and 150′ to rise to clamp the tubing.

While relay R1 was energized, coil 323 of valve E received current to cause valve E to pass oil from pipe 344 to pipe 346 and thence through a valve unit M to pipe 347 to the outer end of center-bend cylinder C3 to effect the center-bending operation as shown in Fig. 25. When the clamps are applied to the tubing, pressure increases in pipe 345a to cause valve K to shift in preparation for the wing-bends. As the wings are moved in response to application of fluid pressure to the outer end of the cylinder C3, switch Ls1 is closed ahead of switch Ls2. When switch Ls1 closes, the coil 351 of relay R3 receives current and R3 closes to connect wires 309 and 310, respectively, with wires 327 and 328 to pass current to coil 326 of valve F. Valve F is then conditioned to pass oil from pipe 343 to pipe 352 which valve K at that time connects with pipe 350 so that pressure is applied to the outer ends of cylinders C4 and C5 to effect the wing-bends as shown in Fig. 26.

After the wing-bends are completed, pressure builds up in pipe 350 to cause valve unit G to close switch 319. When switch 319 closes to cause coil 317 to receive current, coil 314 of valve V having been deenergized by the opening of switch 332, valve D is conditioned to connect pipe 343 with pipe 353 connected with the inner end of cylinder C2 which retracts its backup clamp. When this backup clamp has been retracted, pressure builds up in pipe 353 to cause a sequence valve 354 to pass oil to pipe 355 connected with the inner end of cylinder C1 so that its backup clamp will be retracted after retracting the backup clamp of cylinder C2. The retraction of the clamps in sequence is necessary to avoid interference since the clamps are then closely spaced. When retraction of the clamp of cylinder C1 has been effected, pressure builds up in pipe 353 to cause valve K to shift to initial position to connect pipe 350 with drain t so that pressure is relieved on its outer ends of the cylinders C4 and C5.

The closing of switch Ls2 after switch Ls1 has closed occurs at a time preceding retraction of the clamps by a few seconds. When switch Ls2 closes, the operating coil 360 of a timer Tm is energized and coil 362 of valve L is energized so that valve L cuts off flow to pipe 346 and pressure is relieved at the outer end of cylinder C3. Thus the operation of moving the wings fully toward each other is arrested in order to give time for retraction of both of the clamps which is completed, for example, about 3 seconds after switch Ls2 is closed. At the end of four seconds for example, the timer Tm times out and a switch 361 opens and the coil 362 of valve unit L is deenergized so that valve L becomes conditioned by a spring to resume the connection of pipe 344 with pipe 346 so that the pressure on the left end cylinder C3 is resumed only after the backup clamps have been retracted. The center-bend is completed as shown in Fig. 27 after the clamps have been retracted and while pressure at the outer ends of wing-bend cylinders C4 and C5 is relieved.

Center-bending having been completed, sequence valve M passes oil from pipe 346 to pipe 366 which sequence valve P then connects with pipe 367 connected with the top of center-bend shoe cylinder C6. The lower end of cylinder C6 then being open to drain, the center-bend shoe is lowered. Then pressure builds up in pipe 366 to cause sequence valve P to connect it with pipe 368 connected with the left end of eject cylinder C7 for the purpose of ejecting the serpentine element, as shown diagrammatically in Fig. 28. Actually the serpentine element is squeezed as shown in Fig. 23 between rolls 180.

The switch 320 of unit I then closes and coil 322 of valve E (Fig. 30) is energized. Coil 323 having been deenergized when switch 332 was released, coil 322 conditions valve E to connect pipe 344 with pipe 370 connected through valve unit Q with pipe 371 connected with the inner end of center-bend cylinder C3 to retract center-bend apparatus and to return the wings to normal positions. When this has been done, pressure builds up in pipe 370 to cause sequence valve Q to pass oil from pipe 370 to pipe 372 and through valve R to pipe 373 to cause oil to pass into the right end of eject cylinder C7 in order to return the eject apparatus. As the ejector bar moves to the left or up in Fig. 29, the valve unit J is shifted to cause the valve R to shift to connect pipe 372 with pipe 374 connected by valve N with pipe 375 connected with an accumulator 376 in order to charge the accumulator. This accumulator is provided to prevent any possible downward movement of the piston 55 during the bending operation to insure that the tubing is maintained in proper alignment with the bending shoes during such operation. At the same time, oil is admitted by pipe 375 to the lower end of center-bend shoe cylinder C6 and the center-bend shoe is raised. When the center-bend shoe is raised, pressure in pipe 374 becomes sufficient to cause normally closed switch 338 of unit H to open, thereby deenergizing coil 333 of relay R2 so that there will be no automatic repetition of the cycle and so that, due to deenergization of coil 311 of valve A, valve A will be conditioned by a spring to connect pipe 340a with tank T through pipe t so that pump p is unloaded.

The starting of the cycle requires closure of the push button switch 332 and the cycle will continue until relay R2 opens. The cycle can be stopped when once started by opening a push button stop switch 336. The cycle can be continued where it left off by closing a push button switch 380.

If the machine is idle for a time, the pressure in the accumulator 376 may have been reduced due to leakage. Therefore, before starting the cycle, switch 380 is closed to effect the closing of relay R2 so that the pump will supply pressure to the accumulator 376 to recharge it. The function of the accumulator 376 is to insure that sufficient pressure will be applied to the lower end of the center-bend shoe cylinder C6 so as to be sure that the center-bend shoe is up when the center-bend operation is being performed.

Associated with the accumulator and cylinder C6 is a counterbalance valve N which prevents accumulator pressure fluid from draining back to the tank when line 374 is open to the tank except under certain conditions. When pressure is applied through line 367 to cylinder C6 above the piston 55, to lower the center bend shoe 48 in order to permit ejection of the bent tubing, the valve N is opened to permit fluid to drain from the space below piston 55 so that such piston can descend and during this movement of piston 55 fluid can also drain from the accumulator. At all other times when line 374 is open to the tank, the valve N is closed so that the pressure therein is effective on the lower side of piston 55 to prevent any possible downward movement thereof due to leakage. In this way the action of the valve insures that sufficient pressure is maintained below piston 55 to hold such piston in its uppermost position during the bending operation, but effects relief of such pressure when the piston has to be lowered after the bending operation is completed.

Summary of operation

The pieces of tubing Tu are stacked between rollers 126 and 128, shoes 46 and 48 and rollers 126′ and 128′ as shown in Fig. 24. Clamps 150 and 150′ move into position to clamp the tubing against brackets 125 and 125′. Pressure oil is admitted to the left end of cylinder C3 (Fig. 3) to cause shoes 46 and 48 to move right and the wings 90l and 90r to move about the axis of curvature of shoe 48 to locate the rollers in the position shown in Fig. 25. By concurrent movement of the shoes and the wings, the center-bend is formed as shown in Fig. 25. Movement of the wings effects a control which results in application of pressure oil to the outer ends of cylinders C4 and C5 to cause movement of rollers 128 and 128′ into position 128a and 128a′ as shown in Fig. 26 to form the wing-bends or return-bends which are formed concurrently with formation of the center-bend as shown in Fig. 26. The center-bend is not completed as shown in Fig. 27, because the closing of switch Ls2 (Fig. 30) resulted in relieving pressure in the left end of cylinder C3 for a certain interval of time during which the clamps 150 and 150′ are retracted to permit movement of the wings close together. After both clamps have been retracted, pressure in the outer ends of cylinders C4 and C5 is relieved in order to reduce the pressure exerted by the rollers 128 and 128′ so that the center-bending can be effected without distorting the tubing and the bent tubing can be freely ejected as previously described. After the lapse of time above referred to, and releasing of clamps 150 and 150′, the center-bend is completed by completion of the movement of shoes 46 relative to the shoe 48, accompanied by completion of movement of the wings toward each other, so as to form the serpentine element shown in Fig. 27. As the wings move close together, the pairs of rollers 126, 128 and 126′, 128′ can move slightly toward the axis of curvature of center shoe 48 due to the fact that plates 99 (Fig. 6) have surfaces 99a which curve slightly inwardly toward the center of pedestal 51 coaxial with the axis of shoe 48, there being clearance between pins 85 (Fig. 5) and rollers 84 to permit the slight approach of the pairs of rollers toward the axis of shoe 48 as the center-bend is completed. Therefore, due to this arrangement and due to the fact that pressure in cylinders C4 and C5 is relieved, the tubing is not under tension during the completion of the center-bend. After completion of the center-bend, the center shoe 48 is moved below the stack of pieces of tubing and the bar 42 moves right to eject the tubing as shown in Fig. 28. Following ejection, the moving parts return to initial position shown in Fig. 24 and the machine stops.

While the embodiment of the present invention as herein disclosed, constitutes a preferred form, it is to be understood that other forms might be adopted.

What is claimed is as follows:

1. A machine for bending a straight piece of metal tubing into a serpentine element comprising four substantially parallel portions connected by intermediate bent portions, said machine including a bending shoe held in a fixed position during the bending operation, said shoe having a substantially semicircular surface for engaging the center of the tubing, and about which the tubing is bent to form a center bend, devices engaging the tubing at points spaced from the center thereof, members supporting said devices, said members being normally substantially in alignment with the tubing and rotatable substantially about the axis of curvature of said bending shoe and toward each other to bend the tube at the center, means for concurrently forming return bends at points spaced from the center and adjacent said tube engaging devices, means for ejecting the tube from the machine after the bending operation is completed and a pair of rollers between which the ejected tube is forced by said ejecting means, the distance between said rollers being less than that across the parallel portions of the bent tubing.

2. A machine for bending a straight piece of metal tubing into a serpentine element comprising four substantially parallel portions connected by intermediate bent portions, said machine including a bending shoe having a substantially semicircular surface adapted to be engaged by the center of the tubing and about which the tubing is bent to form a center bend, said shoe being held in fixed position during the bending operation, a movable bending shoe cooperating with said first mentioned shoe, devices engaging the tubing at points spaced from the center thereof, members supporting said tube engaging devices and normally substantially in alignment with the tubing, means for rotating said supporting members substantially about the axis of curvature of said first mentioned shoe and toward each other to bend the tube at the center, means for concurrently forming return bends at points spaced from the center and adjacent said tube engaging devices, a movable bar for ejecting the bent tube from the machine when the bending operation is completed, a cam operated toggle mechanism for moving said movable shoe, power actuated means for operating the cam, a lost motion connection between said cam and the means for rotating said supporting members and power operated means for independently actuating the ejector bar.

References Cited in the file of this patent

UNITED STATES PATENTS

| Number | Name | Date |
|---|---|---|
| 487,679 | Morse | Dec. 6, 1892 |
| 507,878 | Brown | Oct. 31, 1893 |
| 588,099 | Blound | Aug. 10, 1897 |
| 1,066,247 | Brown | July 1, 1913 |
| 1,562,973 | Kuester | Nov. 24, 1925 |
| 1,666,380 | Heinle | Apr. 17, 1928 |
| 1,736,331 | Townsend | Nov. 19, 1929 |
| 1,737,261 | Morin | Nov. 26, 1929 |
| 2,307,544 | Robinson | Jan. 5, 1943 |
| 2,362,054 | Denison | Nov. 7, 1944 |
| 2,453,868 | Shaw | Nov. 16, 1948 |
| 2,491,893 | Duer | Dec. 20, 1949 |

FOREIGN PATENTS

| Number | Country | Date |
|---|---|---|
| 28,387 | Great Britain | Dec. 24, 1903 |
| 543,019 | France | May 24, 1922 |
| 371,300 | Great Britain | Apr. 21, 1932 |